US010263400B2

(12) United States Patent
Taaffe et al.

(10) Patent No.: US 10,263,400 B2
(45) Date of Patent: Apr. 16, 2019

(54) ACTUATOR ASSEMBLY FOR ELECTRICAL SWITCHES HOUSED IN AN ENCLOSURE

(71) Applicant: Hubbell Incorporated, Shelton, CT (US)

(72) Inventors: Steven John Taaffe, Ballwin, MO (US); Anthony Dale Borzillo, St. Louis, MO (US); Steven Howard Maddux, St. Louis, MO (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/259,332

(22) Filed: Sep. 8, 2016

(65) Prior Publication Data

US 2018/0068812 A1   Mar. 8, 2018

(51) Int. Cl.
*H02B 1/26* (2006.01)
*H01H 71/56* (2006.01)
*H01H 19/635* (2006.01)

(52) U.S. Cl.
CPC .............. *H02B 1/26* (2013.01); *H01H 71/56* (2013.01); *H01H 19/635* (2013.01); *H01H 2071/565* (2013.01)

(58) Field of Classification Search
CPC .......... H01H 15/10; H01H 71/56; H01H 3/46; H01H 3/54; H02B 1/26
USPC ..................... 200/329–332, 333–338, 50.02, 200/50.04–50.06, 50.18
See application file for complete search history.

(56) References Cited

U.S. PATENT DOCUMENTS

| 4,337,972 | A   |   | 7/1982  | Gill |
|-----------|-----|---|---------|------|
| 5,286,935 | A   |   | 2/1994  | Mina |
| 5,577,603 | A   |   | 11/1996 | Bogdanovs et al. |
| 5,857,563 | A   |   | 1/1999  | Helmer |
| 5,860,514 | A   | * | 1/1999  | Beattie .................. H01H 13/60 200/523 |
| 7,772,510 | B2  | * | 8/2010  | Manahan ................ H01H 3/08 200/50.02 |
| 2010/0263994 | A1 |  | 10/2010 | Manahan |

OTHER PUBLICATIONS

International Search Report and Written Opinion mailed in corresponding PCT Application PCT/US17/50243 dated Nov. 22, 2017.

* cited by examiner

*Primary Examiner* — Edwin A. Leon
*Assistant Examiner* — Lheiren Mae A Caroc
(74) *Attorney, Agent, or Firm* — Wissing Miller LLP (57) ABSTRACT

An actuator assembly for actuating electrical switches housed in an electrical enclosure is disclosed. The assembly includes at least one handle assembly including a handle positioned above a cover of the enclosure, a trip bracket positioned below the cover and a shaft connecting the handle to the trip bracket. At least one slider actuator is slidably mounted over the electrical switch and coupled to a toggle of the electrical switch. The slider actuator has a drive link which is adapted to be engaged with the trip bracket such that rotation of the handle causes the drive link to slide which in turn causes a linear movement of the slider actuator to toggle the electrical switch. The use of the slider actuator allows a higher density of electrical switches to be stacked inside the enclosure.

37 Claims, 10 Drawing Sheets

ACTUATOR ASSEMBLY FOR ELECTRICAL SWITCHES HOUSED IN AN ENCLOSURE

TECHNICAL FIELD

The present invention relates to actuation devices for electrical switches in an enclosure, and more particularly actuation devices for explosion-proof circuit breaker enclosures.

BACKGROUND OF THE INVENTION

In an environment containing flammable vapors, the arc producing circuit breakers are enclosed within an explosion-proof enclosure. Explosion proof enclosures provide a measure of safety by creating a barrier between flaming gases and the personnel operating the circuit breakers.

The circuit breakers inside the enclosure are designed to be toggled or tripped from the outside by an actuation assembly without opening the enclosure cover (e.g., a lid). The actuation assembly typically includes a shaft that couples a handle located outside the enclosure cover to a toggle of the circuit breaker located under the cover.

As can be appreciated, flame-proof enclosures are very expensive compared to ordinary location enclosures. As such, it is important to increase the density of circuit breakers in the enclosure as much as possible to reduce cost.

Conventionally, relatively large size of the actuation assemblies required additional spacing between adjacent circuit breakers. That meant that the manufacturers are forced to use much larger enclosures. For example, in a 41"×15" enclosure, only about 42 miniature circuit breakers (e.g., Model S201-C20 from ABB of Zürich, Switzerland) can be populated even though more than approximately 60 breakers can be populated if no actuation assembly was needed.

Therefore, there is a need to provide an improved actuation assembly that allows a higher density of circuit breakers to be installed in an enclosure.

SUMMARY OF THE DISCLOSURE

An actuator assembly for actuating electrical switches housed in an electrical enclosure is disclosed. The assembly includes at least one handle assembly including a handle positioned above a cover of the enclosure, a trip bracket positioned below the cover and a shaft connecting the handle to the trip bracket. At least one slider actuator is slidably mounted over the electrical switch and coupled to a toggle of the electrical switch. The slider actuator has a drive link which is adapted to be engaged with the trip bracket such that rotation of the handle causes the drive link to slide which in turn causes a linear movement of the slider actuator to toggle the electrical switch.

In one embodiment, the actuator assembly includes a front panel which is attached to the electrical enclosure over the electrical switch and has an opening through which the toggle of the electrical switch extends. The slider actuator is slidably mounted to the front panel.

The use of the slider actuator allows a higher density of electrical switches to be stacked inside the enclosure.

In another embodiment, a method is provided for assembling an actuator assembly for a plurality of circuit breakers in an electrical enclosure having a cover. The method involves attaching a front panel to the electrical enclosure over the plurality of circuit breakers such that toggles of the circuit breakers extend through an opening of the front panel, slidably mounting a plurality of slider actuators to the front panel over respective ones of the circuit breakers such that each slider actuator is coupled to the toggle of the associated circuit breaker, and attaching a plurality of handle assemblies to the cover of the enclosure, each handle assembly associated with one of the circuit breakers and including a handle positioned above the cover, a trip bracket positioned below the cover and a shaft connecting the handle to the trip bracket such that when the cover is closed, then trip bracket is coupled to the drive link of the associated slider actuator.

DETAILED DESCRIPTION OF THE INVENTION

Figure 1A:
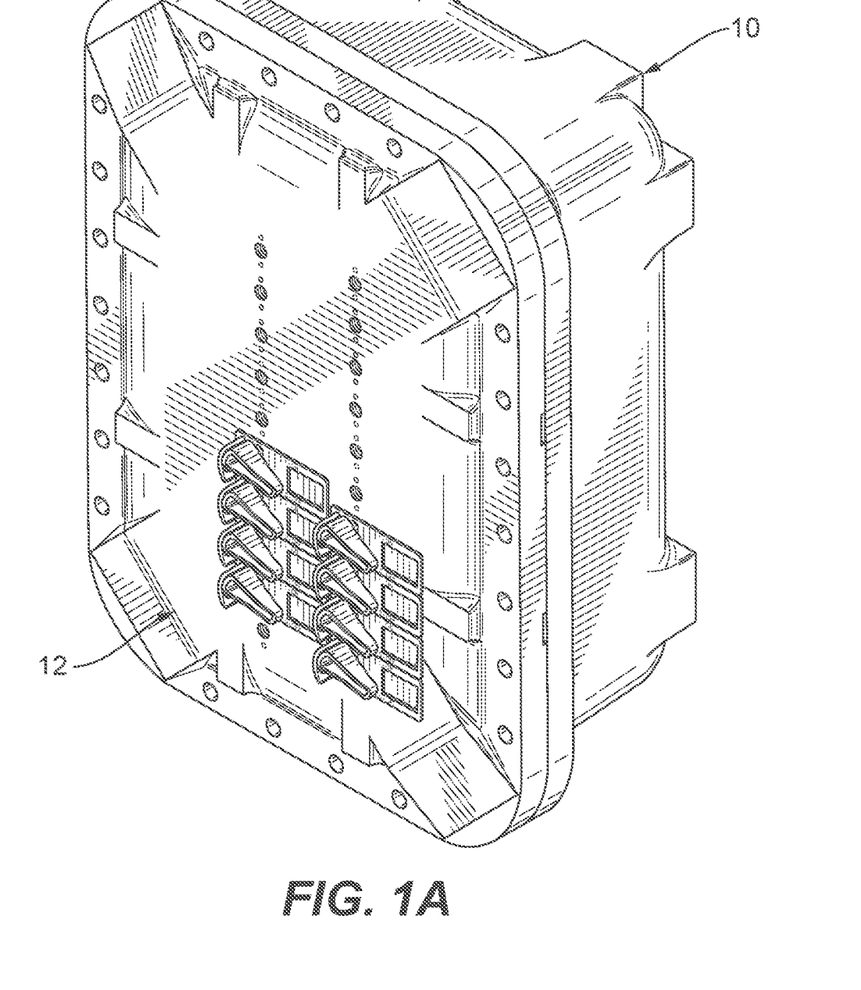
FIG. 1A shows an enclosure according to an aspect of the present invention.
Figure 1B:
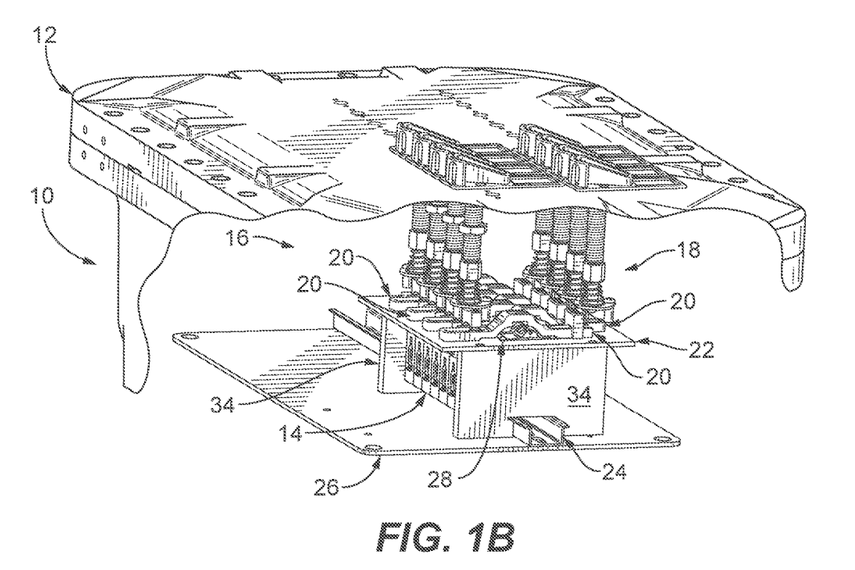
FIG. 1B shows a cut away view of the inside of the enclosure to show an actuation assembly according to an aspect of the present invention.

FIG. 1A shows an enclosure 10 while FIG. 1B shows a cut away view of the inside of the enclosure to show an actuation assembly 16 for switching electrical switches 14 such as circuit breakers. The actuation assembly 16 includes a set of handle assemblies 18, a set of slider actuators 20 and a front panel 22 (e.g., dead front panel). Side spacer plates 34 (e.g., dead front spacers as shown) are slid over and affixed to a metal rail 24 (e.g., DIN rail).

The enclosure 10 typically contains a plurality of circuit breakers 14 that are stacked side by side over the metal rail 24. The metal rail 24 is attached to a sub-panel 26 by fasteners such as screws in a conventional manner. The sub-panel 26 in turn is attached to the bottom of the enclosure 10 with screws.

Figure 2A:
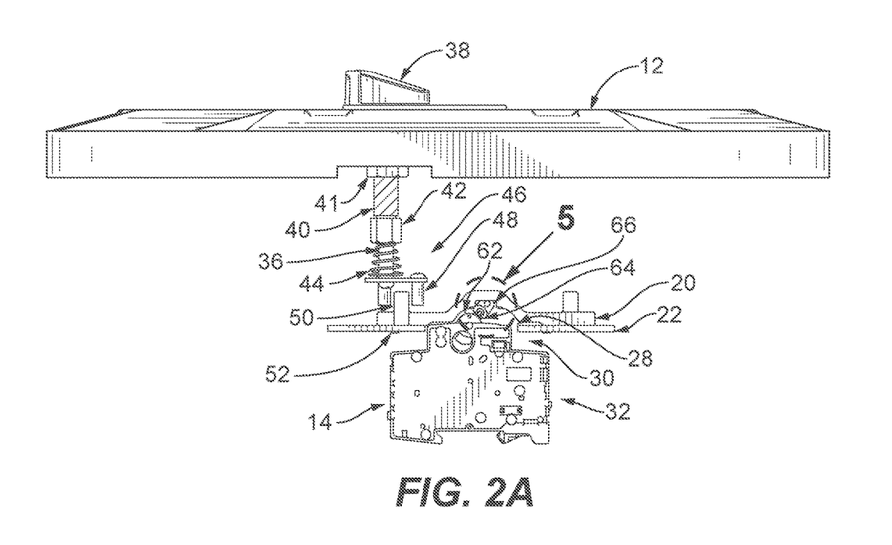
FIG. 2A is a side view of the actuation assembly as shown in FIG. 1B.

Referring to FIG. 2A, each circuit breaker 14 includes an upper part 30 and a lower part 32. The upper part 30 includes a toggle 64, toggle guide 62. In the embodiment shown, a toggle bracket/extender 66 is attached to the toggle 64 to provide a larger area for toggling by a slider actuator 20.

The front panel 22 is attached to side spacer plates 34 with screws to securely fix the circuit breakers 14 in place. The front panel 22 has a rectangular opening 28 through which the toggles 64 and toggle guides/guards 62 extend. The toggles 64 extending above the front panel 22 are engaged by the slider actuators 20. The toggle guides 62 reduce the side to side movement of the toggles 64. The front panel 22 is positioned relatively flush with a top surface of the upper part 30 of the circuit breakers 14.

Figure 2B:
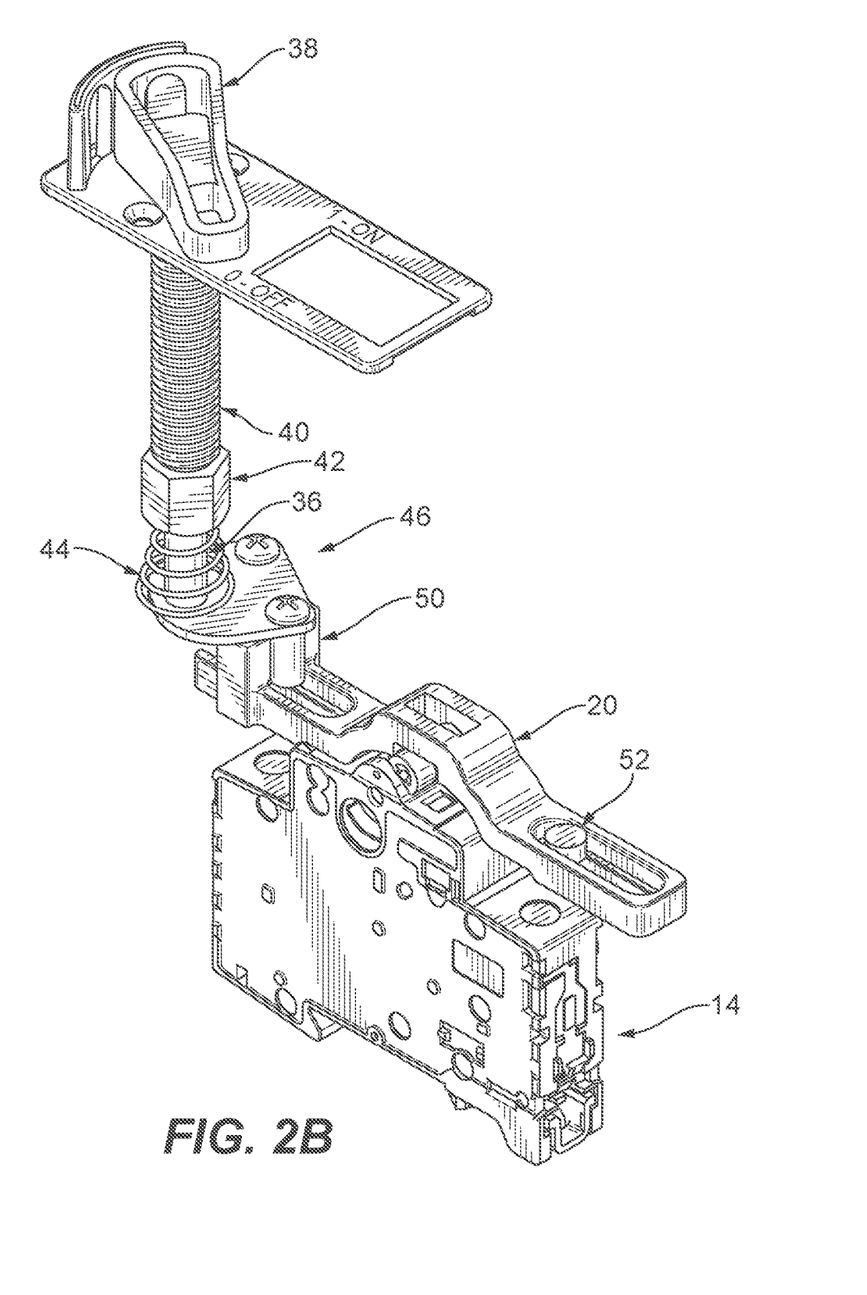
FIG. 2B is a perspective view of the actuation assembly of FIG. 1B.

Referring to FIGS. 2A and 2B, the handle assembly 18 will now be described. An externally threaded bushing 40 is affixed to the cover 12 by a sealing nut 41. The threading forces any flame inside the enclosure 10 to travel a longer distance in order to minimize its escape. A shaft 36 is inserted through the bushing 40 and is freely rotatable inside the bushing. The shaft 36 is attached to a handle 38 on one end and a trip bracket 46 on the other end such that turning of the handle 38 turns the trip bracket in the same circumferential direction. The trip bracket 46 is attached to the bottom of the shaft 36 with a screw (not shown). The trip bracket 46 includes a pair of ears 48 that engage a drive link 50 of the slider actuator 20. The ears 48 are convexly curved/radiused to provide a smooth engagement with the drive link 50.

As shown, a hexagonally shaped portion 42 is part of the bushing 40 as a single integrated piece. A spring 44 is provided between the nut and the trip bracket 46 around the shaft 36. The spring 44 allows the trip bracket 46 and the shaft 36 to move axially relative to the bushing 40.

In the embodiment shown, each handle assembly 18 is associated with one circuit breaker 14 and one slider actuator 20. The slider actuator 20 is slidably mounted over the associated circuit breaker 14 and includes a drive link 50 coupled to the ears 48 of the trip bracket 46 such that rotation of the handle 38 causes a linear movement of the slider actuator to toggle the circuit breaker.

Figure 3A:
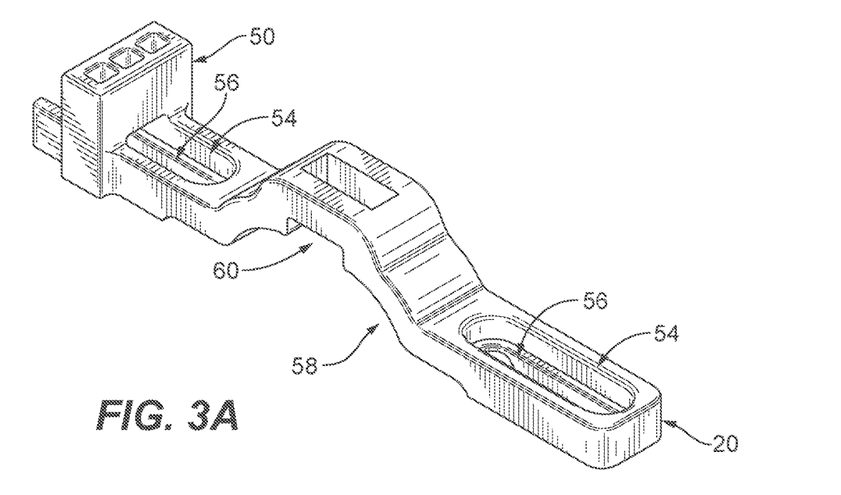
FIG. 3A is a perspective view of a slider actuator of the actuation assembly of FIG. 2B according to an aspect of the present invention.
Figure 3B:
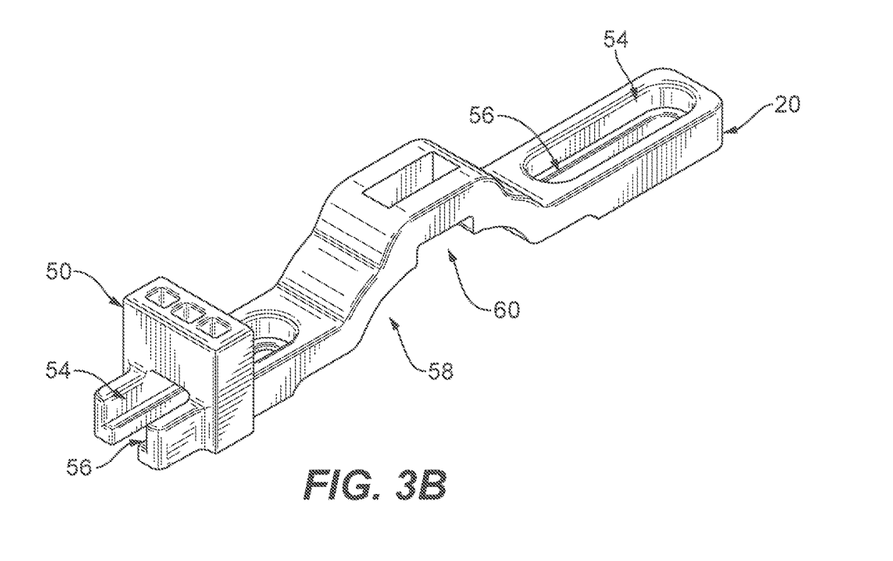
FIG. 3B is another perspective view of the slider actuator of FIG. 2B.

FIGS. 3A and 3B are perspective views of a slider actuator 20 of the actuation assembly of FIG. 2B according to an aspect of the present invention. As shown, a pair of guides 52 (see FIG. 2A) that are attached to the front panel 22 are used to guide the sliding movement of the slider actuator 20. In the embodiment shown, the guides include a pair of pins 52 such as shoulder screws that are screwed into holes in the front panel 22. Each slider actuator 20 has a pair of oppositely disposed longitudinal slots 54 through which the screws 52 are inserted. Each of the longitudinal slots 54 includes a lip 56 over which the head of the screw 52 rides. The lips 54 provide a guide for sliding movement of the slider actuators 20 and prevent them from any vertical movement from the front panel 22.

The drive link 50 is in a rectangular shape and is positioned over one of the longitudinal slots 54. In the embodiment shown, the slot 54 without the drive link 50 is closed on both ends and the slot with the drive link 50 is open on one end.

The slider actuator 20 has a first recess 58 which is curved and a second recess 60 which is rectangular. The second recess 60 is formed within the first recess 58 in the embodiment shown in FIGS. 2A-2B. The first recess 58 is positioned over the curved toggle guide 62 of the circuit breaker 14 and provides clearance for the sliding movement of the slider actuator 20 to toggle the circuit breaker from one position to the other. The second recess 60 receives the toggle 64 of the circuit breaker 14. In the embodiment shown, a toggle bracket/extender 66 is attached to the toggle 64 to provide a larger area for toggling. Accordingly, the second recess 60 receives the toggle extender 66 such that a sliding movement of the slider actuator 20 slides the toggle 64 which in turn toggles the circuit breaker 14 between an open and closed position. Within the first recess 58 of each slide actuator 20 on each side of the second recess 60 may include a wedge 67 shown in the embodiment of FIGS. 2A and 5-8. Each wedge 67 extends from an upper wall 58a and 58b of the first recess 58 and provides additional contact area between slide actuator 20 and the toggle extender 66 as the slider actuator 20 slides the toggle 64, in for example the direction of arrow "A," which in turn toggles the circuit breaker 14 between the open or closed positions.

In the embodiment shown, the width of the slider actuator is 0.55 inches, except the width of the drive link 50 which is 0.75 inches. Preferably, the width of 0.55 inches is less than or equal to the width of a circuit breaker for use with the slider actuators 20 such that the breakers can be stacked without any clearance therebetween. The width of the drive link 50 can be greater than the circuit breaker width because the slider actuators 20 are installed in a staggered manner in which drive links of adjacent breakers are positioned on opposite sides relative to the toggle of the breakers. In another embodiment, the width of the circuit breaker 14 is equal to or greater than 0.75 (width of the drive link 50). In this way, the circuit breakers 14 can be stacked tightly without the need to provide any clearance between them even when the actuators 20 are not installed in a staggered manner.

In the embodiment shown, the slider actuator 20 is made of a single molded plastic part. Preferably, the slider actuator 20 is made from acetal homopolymer resin material such as Delrin™ from Dupont Corporation due to its high structural integrity and self-lubricating properties.

Figure 4A:
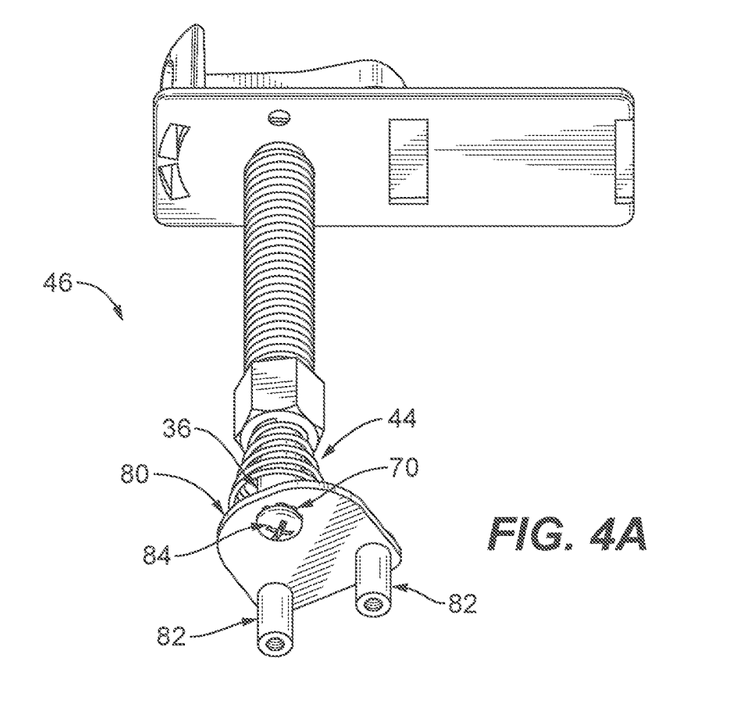
FIG. 4A is an alternative embodiment of a trip bracket of the handle assembly according to an aspect of the present invention.

FIG. 4A is an alternative embodiment of the trip bracket 46 of the handle assembly 18. In this embodiment, the trip bracket includes a trip plate 80 and a pair of ears 82. The trip plate 80 is attached to the shaft 36 by a screw 84 and lock washer 70. The ears 82 are screwed into the trip plate 80 and are cylindrical in shape for engagement with the drive link 50. The cylindrical ears 82 provide a smooth sliding and actuation of the slider actuator 20.

Figure 4B:
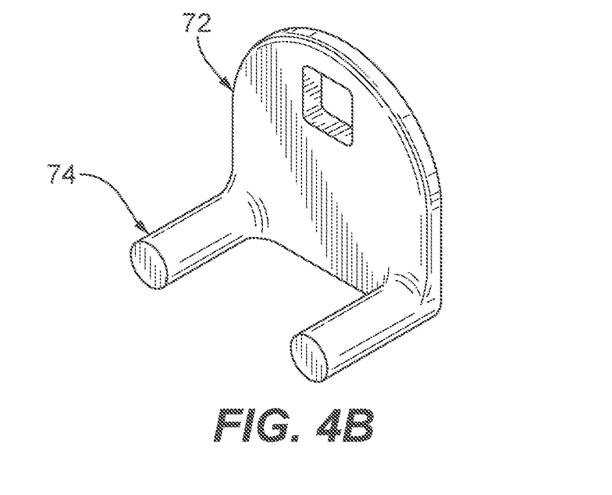
FIG. 4B is an alternative embodiment of a trip bracket of FIG. 4A.
Figure 5:
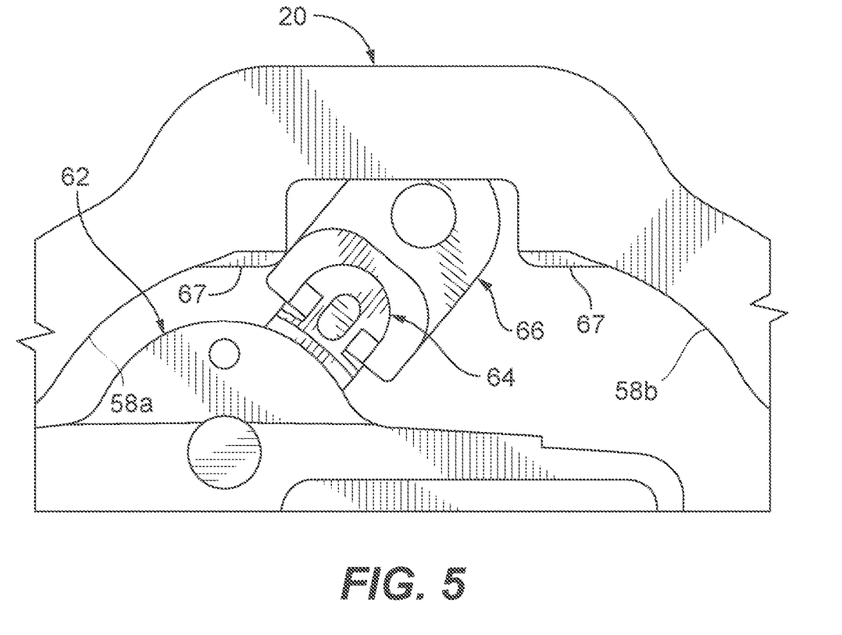
FIG. 5 is an enlarged view of a portion of the slider actuator of the actuation assembly of FIG. 2A taken from detail 5.
Figure 6:
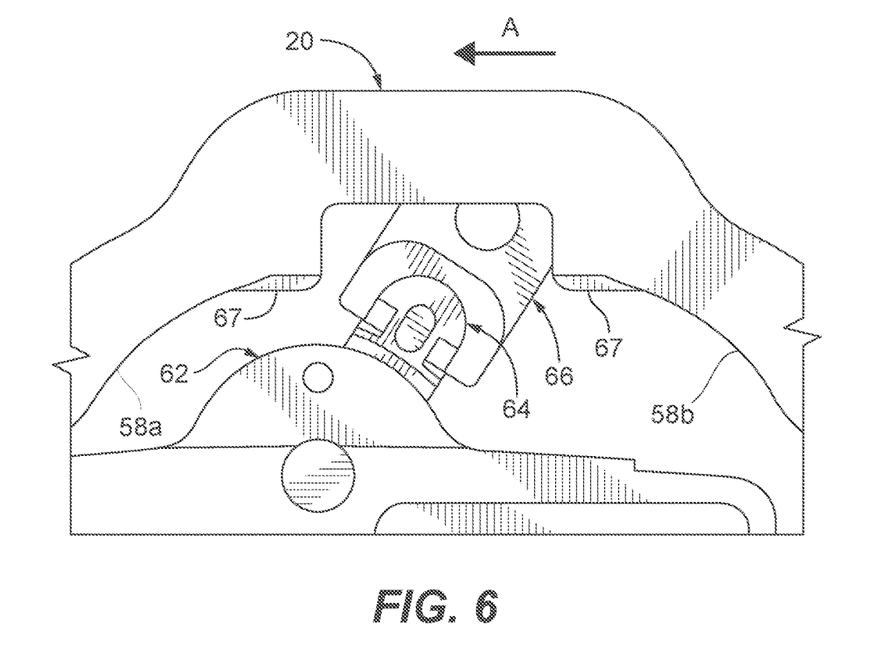
FIG. 6 is the enlarged view of the portion of the slider actuator of FIG. 5 illustrating the slider actuator moving a toggle extender and toggle.
Figure 7:
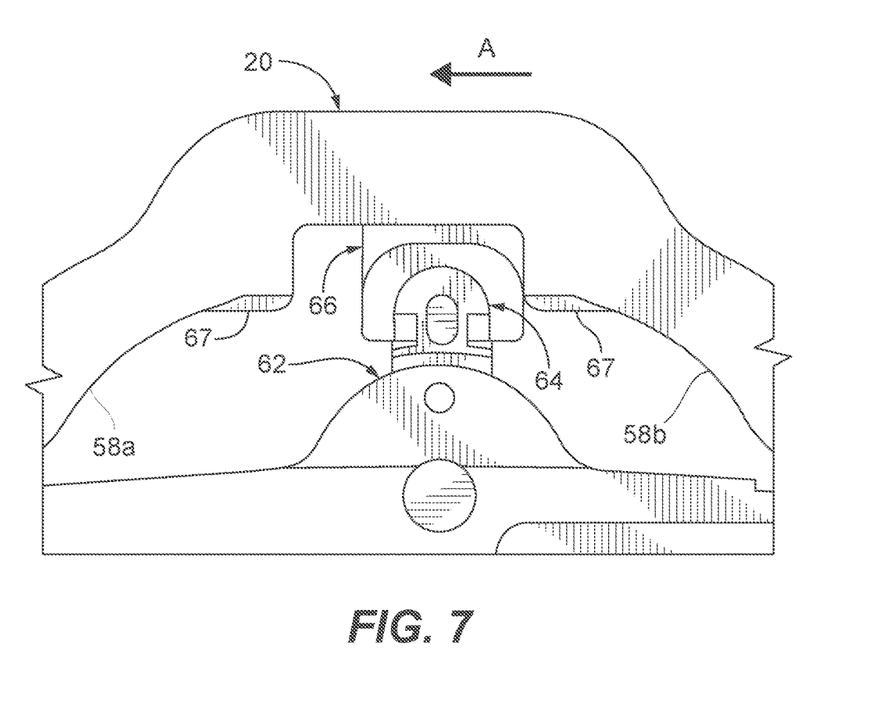
FIG. 7 is the enlarged view of the portion of the slider actuator of FIG. 5 illustrating the slider actuator moving a toggle extender and toggle.
Figure 8:
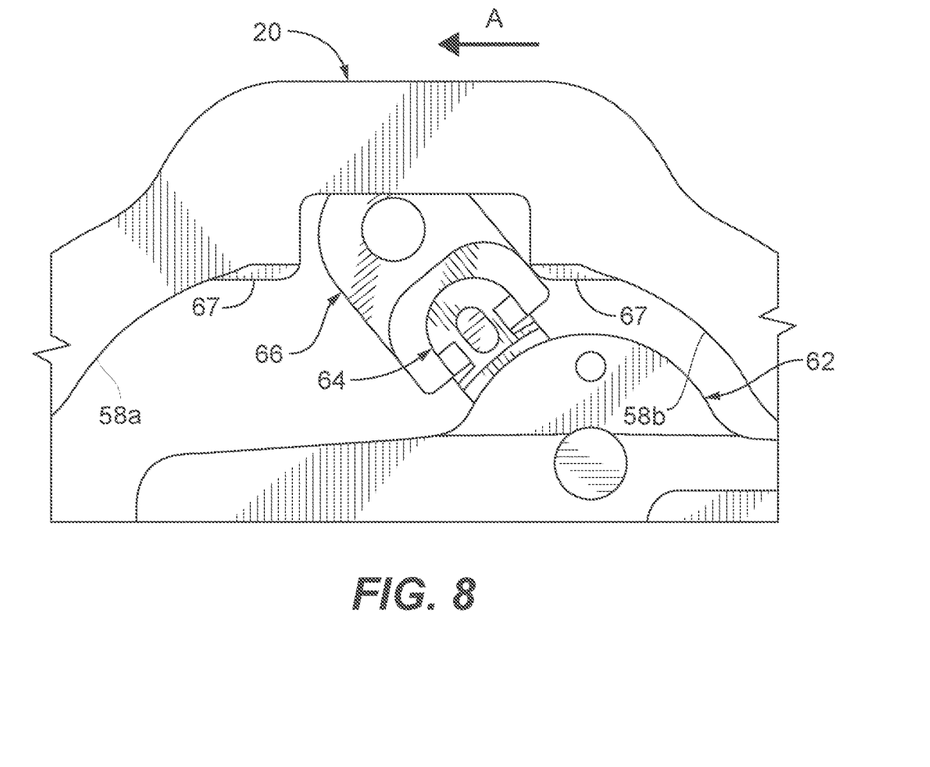
FIG. 8 is enlarged view of the portion of the slider actuator of FIG. 5 illustrating the slider actuator moving a toggle extender and toggle.

Although the trip bracket of FIG. 4A is made of multiple pieces, in an alternative embodiment, the trip plate 80 and ears 82 are made of a single integrated piece, which can be molded or stamped, one embodiment of which is shown in FIG. 4B. As shown in FIG. 4B, the trip bracket is a molded piece, in which the trip plate 72 and ears 74 are formed as a single integrated piece. If the trip bracket is stamped, then the ears 74 can be bent and shaped into the convexly curved or cylindrical shape.

A method of assembling the actuator assembly 16 will now be described. In an enclosure 10, a desired number of circuit breakers 14, which can be of different sizes, are horizontally stacked between the side spacer plates 35.

The front panel 22 is then placed over the stacked circuit breakers 14 such that the toggle guides 62 and toggles 64 extend through the rectangular opening 28. The front panel 22 is then attached to the side spacer plates 35 and thereby to the enclosure 10 by a set of screws (not shown).

For each circuit breaker 14, an associated slider actuator 20 is positioned on top of the breaker. A pair of guides 52 (head screws in the embodiment shown) are screwed into respective holes in the front panel 22 through the longitudinal slots 54 and ride along the slots to allow sliding movement of the slider actuator 20. Preferably, adjacent slider actuators 20 are positioned in the opposite direction such that their drive links 50 are on opposite sides relative to the toggles 64 of the circuit breakers 14 to allow maximum density of the breakers as will be explained below.

For each circuit breaker 14, an associated handle assembly 18 is installed on the cover 12. One end of the shaft 36 with the attached handle 38 is inserted through a respective opening of the cover 12. The threaded bushing 40 with the sealing nut 41 and the hexagonally shaped portion 42 is then inserted over the shaft 36. The sealing nut 41 is then rotated with a wrench while hexagonally shaped portion 42 is being grabbed by another wrench to securely fix the bushing 40 to the cover 12.

The spring 44 is inserted over an exposed portion of the shaft 36 and then the trip bracket 46 is attached to the shaft 36 with the screw 84 and lock washer 70. The spring 44 biases the trip bracket 46 in a downward direction.

As shown in FIG. 2B, the ears 48 of the trip bracket 46 which interact with the drive link 50 are radially offset from the longitudinal axis of the shaft 36. Because of this, the shaft 36 of the handle assembly 18 is positioned over and between two adjacent circuit breakers 14. If adjacent handle assemblies 18 were positioned immediately next to each other on the same side of the circuit breakers 14, a certain amount of clearance spacing between adjacent breakers may be needed to accommodate the radially offset trip brackets 46. Accordingly, for maximum density of circuit breakers 14, it would be preferable to install the handle assemblies 18 in a staggered manner such that the drive links for adjacent slider actuators 20 are located on opposite sides relative to the toggle 64 of the circuit breakers 14.

Once all of the handle assemblies are installed on the cover 12, the cover is closed so that the ears 48 are positioned on both sides of the drive links 50. However, if some of the ears 48 land on top of the drive link 50, the spring 44 allows the trip bracket 46 to move vertically momentarily until the ears pop back down to face both sides of the drive link.

As can be appreciated, the actuator assembly 16 of the present invention allows a maximum number of circuit breakers to be stacked without any clearance between them. For example, in a 24"×36"×8" enclosure, using a conventional actuation assembly 16 may allow about 42 branch circuit breakers or one 4-pole main breaker and 36 branch breakers to be stacked inside the enclosure. By contrast, the present invention allows 90 branch circuit breakers or one 4-pole main breaker with 72 branch breakers to be stacked inside the enclosure. Advantageously, using the present invention allows more than twice the number of circuit breakers to be installed than using conventional actuation assemblies.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. An actuator assembly for at least one electrical switch housed in an electrical enclosure having a cover, the actuator assembly comprising:
   at least one handle assembly including a handle for positioning above the cover, a trip bracket for positioning below the cover and a shaft connecting the handle to the trip bracket;
   at least one slider actuator with each to be associated with one of the at least one electrical switch, the slider actuator being configured to be slidably mounted over the electrical switch and to engage a toggle of the electrical switch, the slider actuator having a drive link that extends in a direction towards the handle and has first and second surfaces; and
   wherein the trip bracket has a first ear extending in a direction toward the drive link and facing the first surface and the trip bracket has a second ear extending in a direction toward the drive link and facing the second surface, such that rotation of the handle causes a linear movement of the slider actuator so that the electrical switch can toggle.

2. The actuator assembly of claim 1, further comprising first and second pins attached to a front panel positioned between the electrical switch and the at least one slider actuator, wherein the first and second pins are attached to the front panel on opposite sides of the electrical switch toggle, and wherein the slider actuator includes first and second longitudinal slots that receive the respective first and second pins for sliding movement of the slider actuator relative to the front panel.

3. The actuator assembly of claim 2, wherein each longitudinal slot includes a lip over which a head of the respective pin rests to prevent the slider actuator from a vertical movement in a direction toward the handle.

4. The actuator assembly of claim 1, wherein the slider actuator includes a first recess positioned to receive the toggle of the electrical switch.

5. The actuator assembly of claim 4, wherein the slider actuator includes a second recess within the first recess capable of receiving a toggle extender attached to the toggle of the electrical switch.

6. The actuator assembly of claim 1, wherein each ear has a convex inner surface for engaging the respective surface of the drive link.

7. The actuator assembly of claim 1, wherein each ear includes a cylindrical member for engaging the respective surface of the drive link.

8. The actuator assembly of claim 1, wherein longitudinal axes of the pair of ears are radially offset from the longitudinal axis of the shaft.

9. The actuator assembly of claim 1, wherein the slider actuator is made of acetal homopolymer material.

10. An actuator assembly for a circuit breaker housed in an electrical enclosure having a cover, the actuator assembly comprising:
    a handle assembly including a handle to be positioned above the cover, a trip bracket to be positioned below the cover and a shaft connecting the handle to the trip bracket;
    a slider actuator configured to be mounted over a toggle of the circuit breaker when installed, the slider actuator comprising:
    a first recess to be positioned over the toggle of the circuit breaker when installed;
    a second recess formed within the first recess to receive the toggle; and
    a drive link adapted to be engaged with the trip bracket such that rotation of the handle causes rotation of the trip bracket and rotation of the trip bracket translates to linear movement of the slider actuator so that the second recess can move the toggle of the circuit breaker.

11. The actuator assembly of claim 10, wherein the slider actuator includes a first longitudinal slot on a first side of the first recess that can receive a first pin for guiding movement of the slider actuator when the handle is rotated, and a second longitudinal slot on a second side of the first recess that can receive a second pin for guiding movement of the slider actuator when the handle is rotated.

12. The actuator assembly of claim 11, wherein each longitudinal slot includes a lip over which a head of the respective pin rests to prevent the slider actuator from a vertical movement toward the handle.

13. An electrical switch enclosure comprising:
an enclosure box;
a cover removably secured to the enclosure box and having a plurality of openings extending through the cover;
a plurality of electrical switches mounted within the enclosure box, each of the plurality of electrical switches include an upper part having a toggle movable between an on-position and an off-position, and a lower part for mounting the electrical switch within the enclosure;
a plurality of actuator assemblies, wherein one of the plurality of actuator assemblies is associated with one of the plurality of electrical switches, and wherein each of the plurality of actuator assemblies comprise;
a handle assembly having a shaft extending through one of the plurality of openings, a handle attached to an end of the shaft above the cover and a trip bracket attached to an end of the shaft below the cover; and
a slider actuator slidably mounted over the electrical switch and having a recess in which the toggle is inserted, the slider actuator having a drive link that extends in a direction towards the cover, the drive link having a first surface and a second surface;
wherein the trip bracket includes a first ear and a second ear that straddle the drive link such that the first ear faces the first surface and the second ear faces the second surface, such that rotation of the handle causes rotation of the trip bracket and rotation of the trip bracket translates to linear movement of the slider actuator causing the toggle to move to the on-position or the off-position.

14. The electrical switch enclosure of claim 13, further comprising a plurality of bushings, wherein one of the plurality of bushings is secured within one of the plurality of openings, and wherein the shaft of the handle assembly associated with the opening extends through the bushing.

15. The electrical switch enclosure of claim 13, further comprising a front panel having a plurality of cover openings, the front panel being positioned between the plurality of electrical switches and the slider actuators such that the toggle of one of the plurality electrical switches extends through one of the plurality of cover openings.

16. The electrical switch enclosure of claim 15, wherein each slider actuator includes first and second longitudinal slots, wherein a first guide pin passes through the first longitudinal slot and is secured to the front panel and a second guide pin passes through the second longitudinal slot and is secured to the front panel, and wherein the first and second guide pins guide the slider actuator relative to the front panel and respective electrical switch as the slider actuator moves the toggle to the on-position or the off-position.

17. The electrical switch enclosure of claim 16, wherein the first longitudinal slot is positioned on a first side of the recess and the second longitudinal slot is positioned on a second side of the recess.

18. The electrical switch enclosure of claim 16, wherein the first longitudinal slot includes a first lip over which a head of the first guide pin rests, and the second longitudinal slot includes a second lip over which a head of the second guide pin rests to limit the slider actuator from vertical movement in a direction toward the cover.

19. The electrical switch enclosure of claim 13, wherein the slider actuators and handle assemblies are disposed in a staggered manner such that the drive links of any two adjacent slider actuators are located on opposite sides of the slider actuators.

20. The electrical switch enclosure of claim 13, wherein the first ear has a convex inner surface for engaging the first surface of the drive link, and the second ear has a convex inner surface for engaging the second surface of the drive link.

21. The electrical switch enclosure of claim 13, wherein the first ear comprises a cylindrical member, and the second ear comprises a cylindrical member.

22. The electrical switch enclosure of claim 13, wherein a longitudinal axis of the first ear and a longitudinal axis of the second ear are radially offset from a longitudinal axis of the shaft.

23. The electrical switch enclosure of claim 13, wherein the slider actuator is made of an acetal homopolymer material.

24. The electrical switch enclosure of claim 13, wherein each of the plurality of electrical switches includes a toggle extender attached to the toggle and wherein the slider actuator includes a second recess within the recess that receives the toggle extender.

25. The electrical switch enclosure of claim 13, wherein each of the plurality of electrical switches comprises a circuit breaker.

26. An electrical switch enclosure comprising:
an enclosure box;
a cover removably secured to the enclosure box and having a plurality of openings extending through the cover;
a plurality of electrical switches mounted within the enclosure box, each of the plurality of electrical switches include an upper part having a toggle having a toggle extender movable between an on-position and an off-position, and a lower part for mounting the electrical switch within the enclosure;
a plurality of actuator assemblies, wherein one of the plurality of actuator assemblies is associated with one of the plurality of electrical switches, wherein each of the plurality of actuator assemblies comprise;
a handle assembly having a shaft extending through one of the plurality of openings, a handle attached to an end of the shaft above the cover and a trip bracket attached to an end of the shaft below the cover;
a slider actuator slidably mounted over the toggle and toggle extender, the slider actuator comprising:
a first recess in which the toggle is positioned;
a second recess formed within the first recess in which the toggle extender is positioned; and
a drive link operatively coupled to the trip bracket such that rotation of the handle causes rotation of the trip bracket and rotation of the trip bracket translates to linear movement of the slider actuator so that the slider actuator moves the toggle extender and toggle to the on-position or the off-position.

27. The electrical switch enclosure of claim 26, further comprising a plurality of bushings, wherein one of the plurality of bushings is secured within one of the plurality of openings, and wherein the shaft of the handle assembly associated with the opening extends through the bushing.

28. The electrical switch enclosure of claim 26, further comprising a front panel having a plurality of cover openings, the front panel being positioned between the plurality of electrical switches and the slider actuators such that the toggle of one of the plurality electrical switches extends through one of the plurality of cover openings.

29. The electrical switch enclosure of claim 28, wherein each slider actuator includes first and second longitudinal slots, wherein a first guide pin passes through the first longitudinal slot and is secured to the front panel and a second guide pin passes through the second longitudinal slot and is secured to the front panel, and wherein the first and second guide pins guide the slider actuator relative to the front panel and respective electrical switch as the slider actuator moves the toggle to the on-position or the off-position.

30. The electrical switch enclosure of claim 29, wherein the first longitudinal slot is positioned on a first side of the first recess and the second longitudinal slot is positioned on a second side of the first recess.

31. The electrical switch enclosure of claim 29, wherein the first longitudinal slot includes a first lip over which a head of the first guide pin rests, and the second longitudinal slot includes a second lip over which a head of the second guide pin rests to limit the slider actuator from vertical movement in a direction toward the cover.

32. The electrical switch enclosure of claim 26, wherein the slider actuators and handle assemblies are disposed in a staggered manner such that the drive links of any two adjacent slider actuators are located on opposite sides of the slider actuators.

33. The electrical switch enclosure of claim 26, wherein the trip bracket includes a first ear and a second ear, and wherein the first ear has a convex inner surface for engaging the first surface of the drive link, and the second ear has a convex inner surface for engaging the second surface of the drive link.

34. The electrical switch enclosure of claim 26, wherein the trip bracket includes a first ear and a second ear, and wherein the first ear comprises a cylindrical member, and the second ear comprises a cylindrical member.

35. The electrical switch enclosure of claim 26, wherein the trip bracket includes a first ear and a second ear, and wherein a longitudinal axis of the first ear and a longitudinal axis of the second ear are radially offset from a longitudinal axis of the shaft.

36. The electrical switch enclosure of claim 26, wherein the slider actuator is made of an acetal homopolymer material.

37. The electrical switch enclosure of claim 26, wherein each of the plurality of electrical switches comprises a circuit breaker.

* * * * *